United States Patent
Wiebe et al.

(10) Patent No.: US 9,450,403 B1
(45) Date of Patent: *Sep. 20, 2016

(54) ELECTRO-OPTIC TERMINAL PROTECTION SYSTEM WITH MATCHING STUB

(71) Applicant: ARC Technology, LLC, Whitewater, KS (US)

(72) Inventors: Aaron Jay Wiebe, Whitewater, KS (US); William John Carey, Whitewater, KS (US)

(73) Assignee: ARC Technology, LLC, Whitewater, KS (US)

( * ) Notice: Subject to any disclaimer, the term of this patent is extended or adjusted under 35 U.S.C. 154(b) by 100 days.

This patent is subject to a terminal disclaimer.

(21) Appl. No.: 14/513,824

(22) Filed: Oct. 14, 2014

Related U.S. Application Data

(63) Continuation-in-part of application No. 14/160,024, filed on Jan. 21, 2014.

(60) Provisional application No. 61/754,778, filed on Jan. 21, 2013.

(51) Int. Cl.
*H02H 9/04* (2006.01)

(52) U.S. Cl.
CPC .................... *H02H 9/042* (2013.01)

(58) Field of Classification Search
CPC ..................................... H02H 9/042
USPC ........................................ 361/111
See application file for complete search history.

(56) References Cited

U.S. PATENT DOCUMENTS

| | | | | |
|---|---|---|---|---|
| 5,760,630 A | * | 6/1998 | Okamoto | H01L 27/0266 257/360 |
| 5,969,929 A | * | 10/1999 | Kleveland | H01L 27/0248 361/111 |
| 6,249,410 B1 | * | 6/2001 | Ker | H01L 27/0251 361/111 |
| 6,331,763 B1 | * | 12/2001 | Thomas | H02H 9/042 320/136 |
| 2007/0263330 A1 | * | 11/2007 | Knapp | H02H 9/046 361/56 |

* cited by examiner

*Primary Examiner* — Thienvu Tran
*Assistant Examiner* — Kevin J Comber
(74) *Attorney, Agent, or Firm* — Knox Patents; Thomas A. Kulaga; Kenneth C. Spafford

(57) ABSTRACT

Apparatus for protecting a device from transients. The apparatus includes a switching network and a transmission line electrically connecting an input to an output. The switching network includes a stub connected near the input with a detector at the other end, a switch, and a communication path therebetween. The detector detects a transient and communicates with the switch. The switch then actuates to place a low impendence across the output of the transmission line, thereby attenuating the transient. The switching network has a switching time that equals the sum of the times to detect the transient at the input, transmit a signal corresponding to the detection to the switch, and actuate the switch. The input signal travels from the input to the output along the transmission line, which has a propagation delay. The propagation delay is greater than the stub propagation time plus the switching time of the switch network.

20 Claims, 5 Drawing Sheets

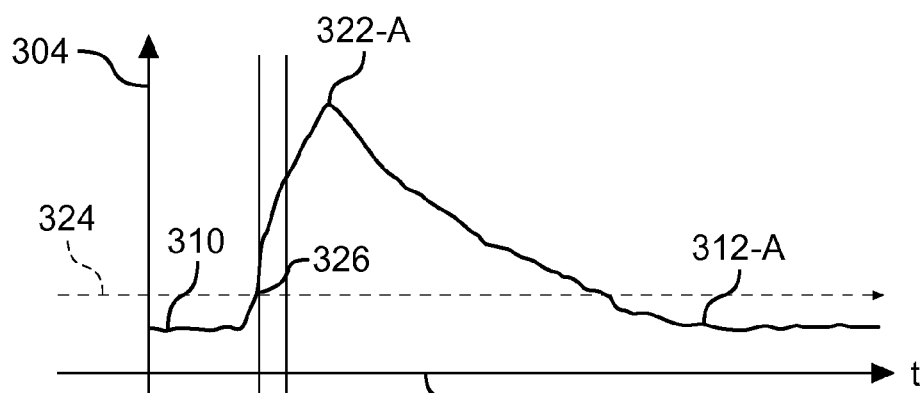
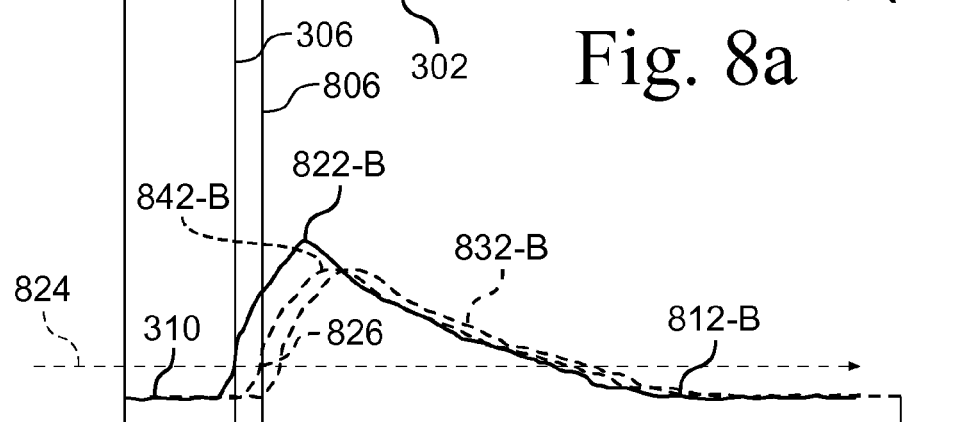
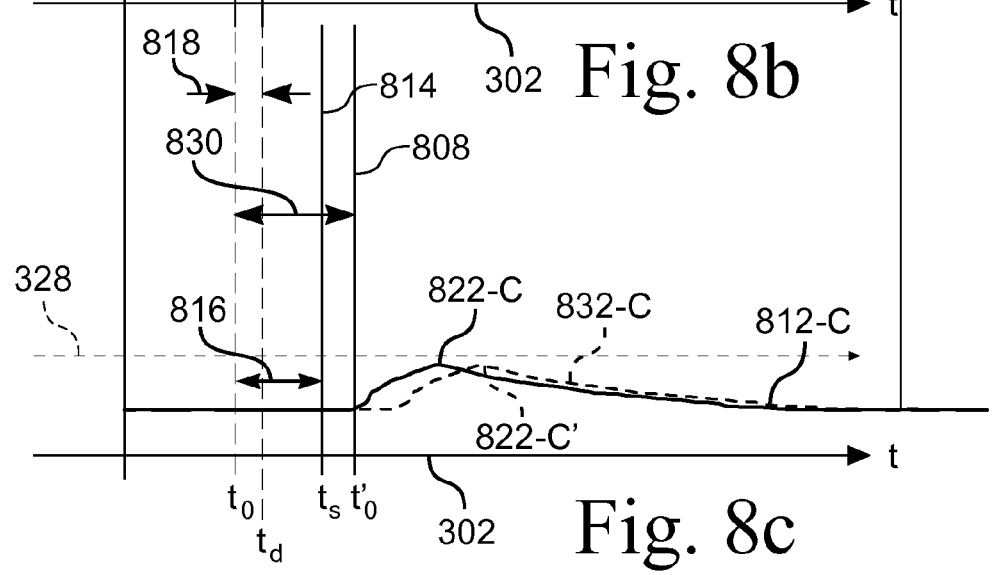

ved by the U.S. Missile Defense
ELECTRO-OPTIC TERMINAL PROTECTION SYSTEM WITH MATCHING STUB

CROSS-REFERENCE TO RELATED APPLICATIONS

This application is a continuation-in-part of prior application Ser. No. 14/160,024, filed Jan. 21, 2014, which claims the benefit of U.S. Provisional Application No. 61/754,778, filed Jan. 21, 2013.

STATEMENT REGARDING FEDERALLY SPONSORED RESEARCH OR DEVELOPMENT

This invention was made with Government support under HQ0147-13-C-7162 awarded by the U.S. Missile Defense Agency. The Government has certain rights in the invention.

BACKGROUND

1. Field of Invention

This invention pertains to a protection system that attenuates a transient in a signal before the signal is delivered to a driven device that is sensitive to transients. More particularly, this invention pertains to a protection system that generates a detection signal upon detection of a transient in an input signal and the detection signal operates a fast switch that attenuates the transient before it reaches the driven device.

2. Description of the Related Art

As our understanding of physics increases there has been a concerted effort to move away from mechanical type projectile weapons. Directed energy weapons (DEW) are being investigated for non-projectile weaponry. Generally, directed energy weapons project a beam of energy toward a target, thereby transferring energy from the weapon to the target. Types of directed energy weapons being investigated include those that use fast ultra wideband (UWB) pulses and high power microwave (HPM) signals.

When the target of a directed energy weapon is a radar system, the radar system can be damaged or taken out of service from the blast of energy. Recent advances in directed energy weapons require radar systems to implement front door protection against such high power signals.

Nonlinear protection elements such as plasma limiters have been successfully employed to protect against electrostatic discharge and near electromagnetic pulse (EMP) transients. But such devices have a finite turn-on time that does not permit them to fully block the first nanosecond or more of transients from some directed energy weapons. Fast ultra wideband pulses and high power microwave signals can inject significant transients into the radar front door within a short window of time. It is desirable to attenuate or block such damaging signals from sensitive electronic equipment.

BRIEF SUMMARY

According to one embodiment of the present invention, a protection system having an input and an output with a switch network for attenuating or blocking transients from the output is provided. In the protection system, a detection signal is generated upon detection of a transient in an input signal at the input. The detection signal operates a fast switch that attenuates or blocks the transient before the transient reaches the output. In this way, potentially damaging transients at the input are prevented from reaching the output.

The protection system includes a detector connected to the outboard end of a quarter-wave stub that has an opposite end connected adjacent the input to the system. The quarter-wave stub is an impedance matching device between the input and the detectors. The stub has a very low insertion loss over a range of frequencies. The stub allows for the detector to have a lower impedance than the transmission line between the input and the output, thereby avoiding the effects of an impedance mismatch by connecting the detector directly to the transmission line.

The detector senses when the input signal exceeds a threshold value, thereby indicating a transient. The detector is connected to a switch that is adjacent the output of the system. The switch attenuates or blocks the input signal before it reaches the output. In one embodiment the switch puts a low impedance across the output upon actuation by the detector. In another embodiment the switch is in series with the conductor carrying the input signal and creates a high impedance upon actuation by the detector. An electrical transmission line is electrically connected between the detector and the switch. The electrical transmission line has an associated propagation delay that is greater than the operating delay introduced by the switch network. The switch network includes the detector, the connection from the detector to the switch, and the switch.

In one embodiment, the detector is an electrical-to-optical (E-O) converter, such as a light emitting diode (LED), and the switch is a photoswitch that is responsive to the optical signal or light from the E-O converter. The E-O converter is optically connected to the photoswitch, such as through an optical fiber. The electrical transmission line has an associated delay that is greater than the operating delay introduced by the E-O converter, the optical connection, and the photoswitch.

The protection system protects against both transients and signals that last longer, including those that extend to DC. The protection system is a quasi-passive, solid state electro-optic terminal protection system (EOTPS) that blocks high power transient and extended signals from the front end of sensitive electronic equipment. Such transients include fast ultra wideband (UWB) and high power microwave (HPM) signals. One advantage to the protection system is that it is capable of handling multiple transients. That is, the protection system is configured to dissipate the energy in the transient without being destroyed, thereby leaving the protection system ready to handle a second transient.

In one embodiment, the protection system uses power from the incoming transient to drive the detectors, such as laser diodes, that activate the switches, such as silicon photoswitches. The switches short the signal line to ground, thereby attenuating the transient. The protection system is passive because no external power other than the power in the transient is required. In another embodiment, the switch network is excited or externally powered. In this embodiment the detectors and/or switches have external excitation that allows the devices to respond in less time than if the devices were powered solely from the signal being monitored.

The delay in the switch network is less than the propagation delay in the electrical path, permitting the switch to become fully conductive before the electrical signal with the transient arrives at the switch. With the switch turned on and conductive, the transient is significantly attenuated before it reaches the output device, which may be another sensor or a low noise amplifier (LNA) of a radar system.

BRIEF DESCRIPTION OF THE SEVERAL VIEWS OF THE DRAWINGS

The above-mentioned features will become more clearly understood from the following detailed description read together with the drawings in which:

FIG. 8a is a graph of the signal over time at a first test point for the embodiment illustrated in FIG. 6.

FIG. 8b is a graph of the signal over time at a second test point for the embodiment illustrated in FIG. 6.

FIG. 8c is a graph of the signal over time at a third test point for the embodiment illustrated in FIG. 6.

DETAILED DESCRIPTION

Figure 1:
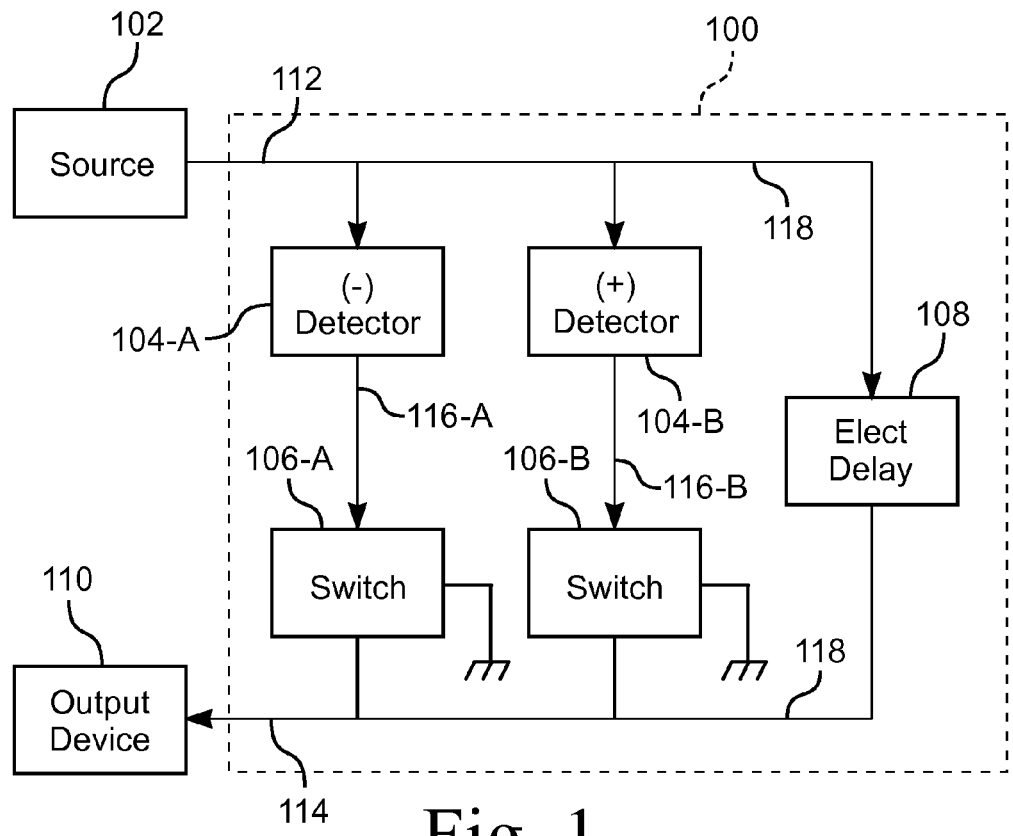
FIG. 1 is a block diagram of one embodiment of the terminal protection system.

Apparatus for a protection circuit 100 is disclosed. The terminal protection system 100 attenuates a transient 322 in a signal 312. The protection system 100 is generally indicated as 100 with particular embodiments and variations shown in the figures and described below having an alphabetic suffix, for example, 100-A. Other elements are described generically below and are uniquely identified when pertinent to the discussion, for example, the photo-switches 106 are generally indicated as 106 with particular embodiments and variations shown in the figures and described below having a suffix, for example, 106-A, 106-B, 106-A1, etc.

FIG. 1 illustrates a block diagram of one embodiment of the terminal protection system 100. A source 102 is connected to the input 112 and provides a signal 312 to the protection system 100. The signal 312 is generally a low level signal 310 that is subject to transients 322. For example, the source 102 in one embodiment is the front end of a radar system with the signal 312 including fast ultra wideband (UWB) and high power microwave (HPM) signals as transients. The transient 322 is of the type such as resulting from directed energy weapons (DEW) and/or electrostatic discharge and near electromagnetic pulse (EMP) transients.

An output device 110 is connected to the output 114 of the protection system 100. For example, the output device 110 in one embodiment is a low noise amplifier (LNA) of the radar system. The protection system 100 has a transmission line 118 connecting the input 112 to the output 114. That transmission line 118 has an electrical propagation delay 108. In various embodiments, the electrical delay 108 is implemented by a conductor such as a trace 118-A on a coplanar waveguide or a coaxial cable. The propagation delay of the electrical signal 312 resulting from the length and propagation speed of the conductor 118-A provides the electrical delay 108. For copper transmission lines, the propagation speed is generally 0.59 to 0.77 times the speed of light c. The conductor 118 has a length sufficient to provide the requisite delay 108.

The source 102 is connected to the input 112 of the protection system 100. Connected physically close to the input 112 are detectors or sensors 104, such as electrical-to-optical (E-O) converters. In various embodiments the detectors 104 are light emitting diodes, such as laser diodes, that are powered by the energy in the transient 322 or are separately excited. The detectors 104 have a fast response time when detecting when the input signal 312-A exceeds a setpoint value 324.

In one embodiment, one detector 104-A monitors the negative going signal portion at the input 112. When the absolute value of the negative going portion of the input signal 312 exceeds a threshold value, a signal 116-A is generated and transmitted to a switch 106-A that places a low impedance across the output 114 to ground. Another detector 104-B monitors the positive going signal portion at the input 112. When the positive going portion of the input signal 312 exceeds a threshold value, a signal 116-B is generated and transmitted to a switch 106-B that places a low impedance across the output 114 to ground. In one embodiment, each detector 104 triggers multiple switches 106 to ensure that the power of the transient 322 is adequately dissipated to ground. In another embodiment, multiple detectors 104 trigger multiple switches 106 to ensure that the power of the transient 322 is adequately dissipated to ground. In these various embodiments, the detectors 104 and switches 106 form a switching network.

In another embodiment, the detectors 104 have an output that varies based on the input signal 312-A intensity. The switches 106 have a setpoint and the switches 106 actuate when the output from the detectors 104 passes the setpoint value. For example, in the embodiment where the detectors 104 are LEDs, the emitted light has a characteristic that varies based on voltage. The switches 106 are configured to actuate when the varying characteristic of the LED light reaches a specified value.

The actuation time of the detectors 104, the transmission time of the detection signal 116, and the actuation time of the switches 106 is less than the electrical delay 108 connecting the input 112 to the output 114. In this way, when a transient 322 is detected at the input 112, the output 114 is attenuated before the transient 322 reaches the output 114.

Figure 2:
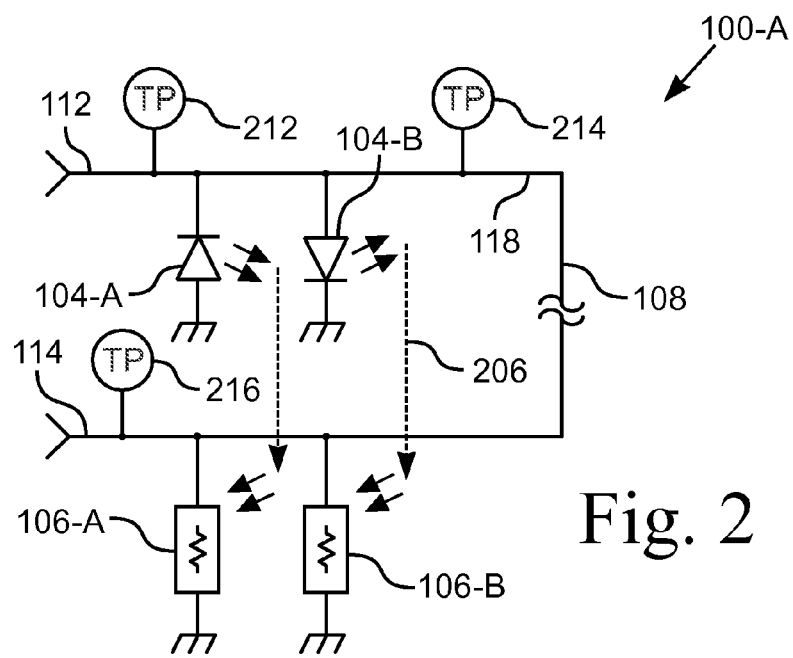
FIG. 2 is a simplified schematic diagram of one embodiment of the protection system.

FIG. 2 illustrates a simplified schematic diagram of one embodiment of a terminal protection system or circuit 100-A. In the illustrated embodiment, the detectors 104-A, 104-B are E-O converters, such as LEDs, each with a optical fiber 206 connecting the detector 104-A, 104-B to a corresponding switch 106-A, 106-B. The switches 106-A, 106-B are photoswitches responsive to the optical signals 116-A, 116-B from the detectors 104-A, 104-B. The electrical delay 108 is implemented by selecting a length and/or propagation speed for the transmission line 118 between the input 112 and the output 114. In the illustrated embodiment, the connection between the detectors 104-A, 104-B and switches 106-A, 106-B operate in the optical domain through the fiber optic connections 206. In other embodiments, the connection between the detectors 104-A, 104-B and switches 106-A, 106-B operate in other domains, such as the electrical domain or by way of a direct physical connection such as would be found on semiconductors sharing a common substrate. For the embodiment in which the connection is in the electrical domain, the length of the connection is substantially less than the transmission line 118 such that the propagation delay of the detector to switch connection 206 is substantially less than the electrical delay 108 of the transmission line 118. In such an embodiment, the detector response time and the switching time, when added to the propagation delay, must be less than or equal to the electrical delay 108 of the transmission line 118 between the detector 104 and the switch 106.

Electrically, the protection system 100-A has the circuit equivalence of a transmission line. In one embodiment, the protection system 100-A has a 50 ohm impedance. In one embodiment the E-O converters 104-A, 104-B and the photoswitches 106-A, 106-B do not present a significant impedance mismatch to the circuit, thereby minimizing the losses in the protection system 100-A.

Figure 3A:
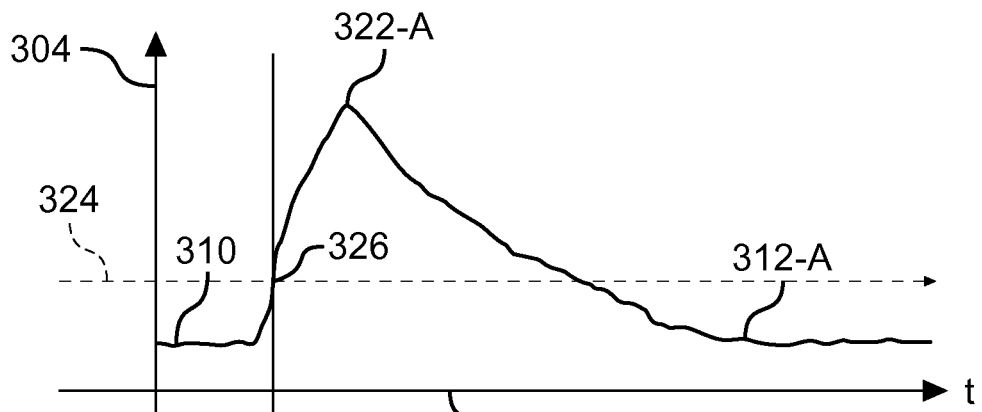
FIG. 3a is a graph of the signal over time at a first test point.
Figure 3B:
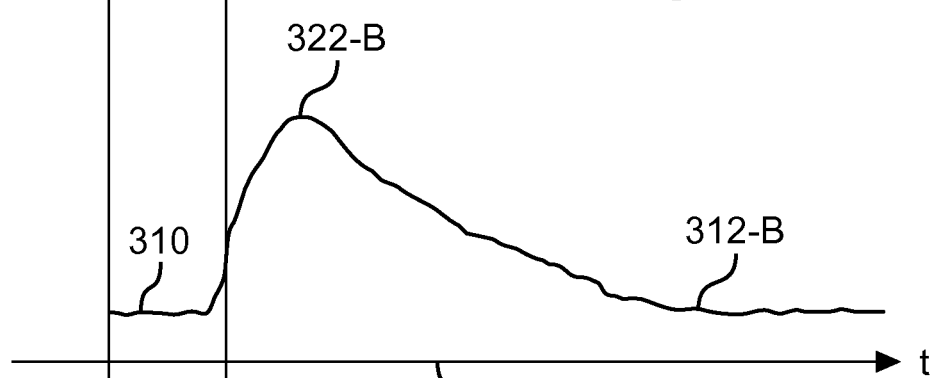
FIG. 3b is a graph of the signal over time at a second test point.
Figure 3C:
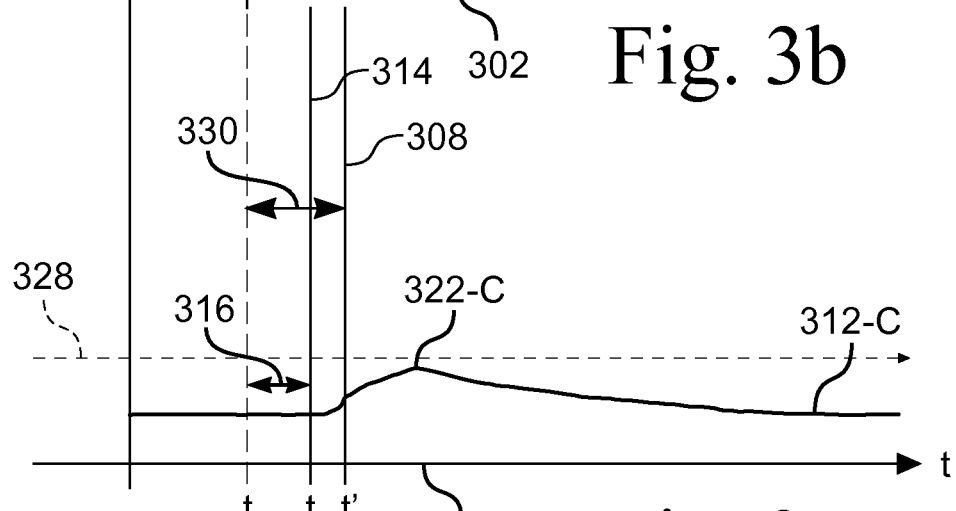
FIG. 3c is a graph of the signal over time at a third test point.

FIGS. 3a, 3b, and 3c illustrate graphs showing how the protection system 100 affects the input signal 312 having a transient 322 as the signal 312 travels from the input 112 to the output 114 of the system 100. The graphs plot signal amplitude 304 over time t 302. The embodiment of the protection system 100-A illustrated in FIG. 2 includes various test points 212, 214, 216 that correspond to the signals 312-A, 312-B, 312-C illustrated on the graphs of FIGS. 3a, 3b, and 3c. Each of the signals 312-A, 312-B, 312-C includes the effects of the transient 322-A, 322-B, 322-C.

FIG. 3a illustrates a graph of the signal 312-A over time at the first test point 212. The first test point 212 is located at the input 112 and provides information on the input signal 312-A, including any transients 322-A as received by the protection system 100. The input signal 312-A includes a steady state portion 310 and a transient portion 322-A. Before the start time $t_0$ 306 of the transient 322-A, the signal 312-A at the input 112 has a steady state 310 corresponding to the normal signal from the source 102. The transient 322-A starts at time $t_0$ 306 to produce the composite input signal 312-A. The transient 322-A has a fast rise time, typically on the order of nanoseconds. The waveform of the transient 322-A varies based on the type and characteristics of the transient 322-A, plus any changes due to circuit impedance before reaching the input 112 of the protection system 100.

The chart of FIG. 3a also shows the threshold trigger level 324 of the detector 104. When the amplitude 326 of the transient 322-A equals or exceeds the threshold trigger level 324, each of the detectors 104 are triggered to produce a signal 116 sent over the line 206 to a corresponding switch 106. The threshold trigger level 324 is at a level that the output device 110 is capable of withstanding. That is, the output device 110 has a maximum input level 328 that can be applied to it without causing damage or otherwise adversely affecting the output device 110. The threshold trigger level 324 is equal to or less than the maximum input level 328 of the output device 110. In this way the protection system 100 is not triggered for levels of the signal 312-A that the output device 110 can safely handle.

It bears noting that the graphs show amplitude 304, not polarity. The pair of detectors 104-A, 104-B, one for each polarity, have the same threshold trigger level 324 and will trigger the switches 106-A, 106-B, respectively, when the absolute value of the signal amplitude 326 reaches the threshold trigger level 324.

FIG. 3b illustrates a graph of the amplitude 304 of post-detection signal 312-B over time t 302 as measured at the second test point 214, which is on the opposite side of the detectors 104-A, 104-B than the input 112, that is, it is representative of the signal 312 as it enters the transmission line 118. The post-detection signal 312-B includes a slightly diminished transient portion 322-B due in part from the draw by the detectors 104-A, 104-B of their operating power from the transient 322.

FIG. 3c illustrates a graph of the amplitude 304 of the output signal 312-C over time t 302 at the third test point 216, which is located at the output 114. The output signal 312-C is the signal that goes to the output device 110. The output signal 312-C includes a transient remnant 322-C that has a maximum amplitude less than the maximum input level 328 of the output device 110. The reduction in amplitude of the transient 322-C is due to the switches 106 being triggered by the sensors 104 before the transient 322-C reaches the switches 106, thereby resulting in an attenuated signal 312-C.

The transient start time $t_0$ 306 is shown at the point 326 where the amplitude of the input signal 312-A crosses the threshold trigger level 324. The output signal 312-C is shifted in the time domain from the input signal 312-A by the delta 330 between the transient start time $t_0$ 306 and output time $t'_0$ 308. This time delay 330 corresponds to the electrical propagation delay 108 of the protection system 100. For example, the time delay 330 is implemented by a length of transmission line 118 that has sufficient length to produce the electrical delay 108. In one test the delay 330 was on the order of 17 nanoseconds, which is sufficient to attenuate energy spikes induced from a directed energy weapon.

The transient start time $t_0$ 306 at the point 326 is where the detector 104 can first react to or detect the transient 322-A. The detector 104 has a response time before it provides an output or detected signal 116 indicating that a transient 322-A has been detected. That detected signal 116 has a propagation time to travel between the detector 104 and the corresponding switch 106. Then the switch 106 has an actuation time before it causes a low impedance connection to be made between the transmission line 118 and ground. The sum of the detector response time, the detected signal propagation time, and the switch actuation time is the switching time delay 316. The switch 106 is actuated at switch time $t_s$ 314 such that the switch 106 attenuates and/or reflects the input signal to produce the waveform 312-C illustrated in FIG. 3c. The attenuation and/or reflection occurs because the switching time delay 316 is less than or equal to the delta 330 representative of the electrical propagation delay 108 of the transmission line 118. In this way the low impedance connection across the output 114 attenuates the input signal 312 such that it has the waveform 312-C illustrated in FIG. 3c.

Figure 4:
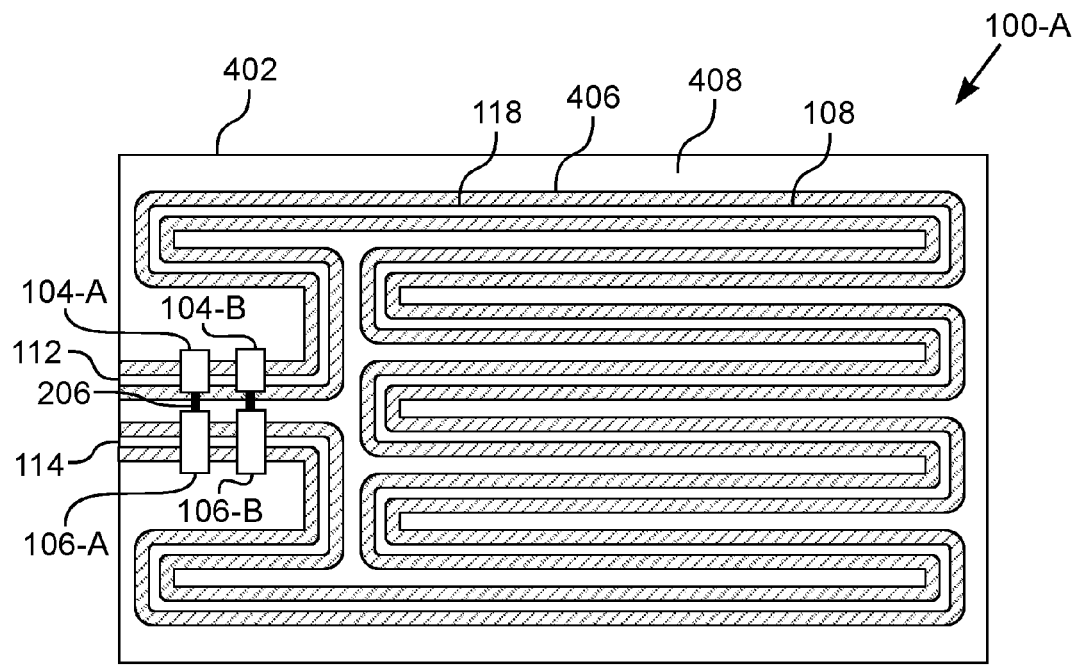
FIG. 4 is a plan view of the protection system of FIG. 2 that is implemented with a coplanar waveguide.

FIG. 4 illustrates a plan view of the terminal protection system 100-A shown in FIG. 2 that is implemented with a coplanar waveguide 402. The coplanar waveguide 402 has a conductor 118 flanked by gaps exposing the dielectric 406 between the conductor 118 and the coplanar ground plane 408. The conductor 118 terminates at the input 112 at one end and at the output 114 at the other end. In order to keep the length of the connection 206 between the detectors 104 and the switches 106 as short as possible, the input 112 and output 114 are located adjacent to each other. The illustrated conductor 118 has a serpentine layout so that the conductor 118 has a length sufficient to create the electrical delay 108. The physical length of the conductor 118 forming the illustrated embodiment of the electrical delay 108 is sufficient to create an electrical delay 108 that is greater than the switch network operating time. The switch network operating time includes the time for the detectors 104 to sense the transient 322-A at the input, the time for propagation of the signal 116 indicating the presence of the transient 322-A at the detectors 104 to the switches 106, and the time for the switches 106 to operate to block the transient 322-C at the output 114. Having the length of the conductor 118 long enough for a delay 108 greater than the switch network operating time allows for the transient 322 to propagate to the output 114 after the switches 106 are actuated and attenuating the signal 312-C.

In the illustrated embodiment, the portions of the conductor 118 proximate the input 112 and the output 114 are parallel and a short distance apart. One detector 104-A is positioned over the conductor 118 and an adjacent ground plane 408 with the detector 104-A leads making electrical contact with the conductor 118 and the adjacent ground plane 408. Extending from the detector 104-A is the optical fiber 206 that connects to the switch 106-A. The switch 106-A is positioned over the conductor 118 and both adjacent ground plane 408 with the switch 106-A leads making contact with the conductor 118 and the adjacent ground plane 408. Adjacent the first detector 104-A is a second detector 104-B that is positioned over the conductor 118 and the opposite adjacent ground plane 408. The detector 104-B leads make electrical contact with the conductor 118 and the adjacent ground plane 408. Extending from the detector 104-B is the fiber 206 that connects to the switch 106-B. The switch 106-B is positioned over the conductor 118 and both adjacent ground planes 408 with the switch 106-B leads making electrical contact with the conductor 118 and the adjacent ground planes 408. In the illustrated embodiment, the switches 106-A, 106-B each provides two paths to ground 408 when actuated by the detection signal 116-A, 116-B from the corresponding detectors 104-A, 104-B.

Figure 5:
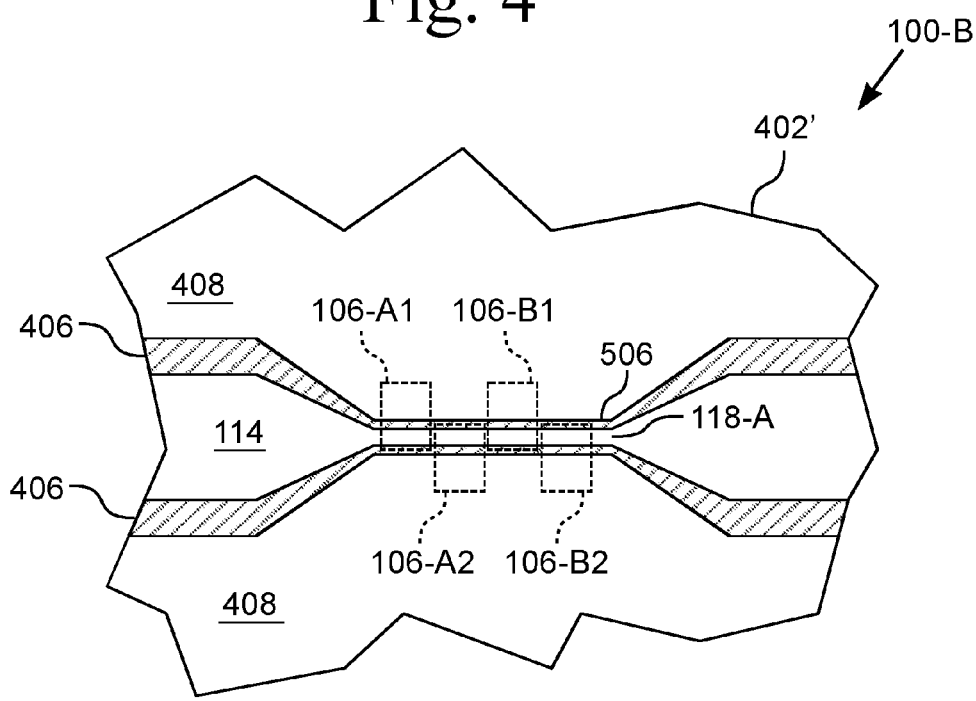
FIG. 5 is a partial plan view of another embodiment of a protection system with a coplanar waveguide.

FIG. 5 illustrates a partial plan view of another embodiment of a protection system 100-B with a coplanar waveguide 402' having a tapered waveguide structure 506 at the output 114. FIG. 5 also illustrates in phantom a pair of switches 106-A1 & -A2, 106-B1 & -B2 for each detector 104-A, 104-B. Each pair of switches 106-A1 & -A2, 106-B1 & -B2 corresponds to one of the switches 106-A, 106-B shown in FIG. 4. Each switch 106-A1 & -A2, 106-B1 & -B2 is electrically connected to the conductor 118-A and to one of the two ground planes 408 adjacent the conductor 118-A.

The geometry of the tapered structure 506 minimizes the gap between the conductor 118-A and the ground plane 408 at the switch location. The tapered structure 506 with the switches 106 being connected to the conductor 118-A and to one of the two adjacent ground planes 408 allows for the use of a smaller, more compact switch 106 with a comparably shorter actuation time. The switches 106 are dependent upon optical energy to actuate. The reduced size of the switch 106-A1 & -A2, 106-B1 & -B2 to accommodate the tapered structure 506 reduces the amount of energy required for actuation of each switch 106-A1 & -A2, 106-B1 & -B2. In one embodiment, a single detector 104-A, 104-B is optically connected to a pair of switches 106-A1 & -A2, 106-B1 & -B2. In another embodiment, each switch 106-A1, 106-A2, 106-B1, 106-B2 is connected to a single detector 104-A, 104-B.

In one prototype, the tapered structure 506 has a 25 micrometer width. During testing, the off-state attenuation with one photoswitch was 2-3 dB, depending upon frequency. The attenuation was primarily due to the line resistance. The tested on-state attenuation with one photoswitch was 22 dB. In the illustrated embodiment, multiple switches increases the attenuation when the switches 106-A1, 106-A2, 106-B1, 106-B2 are actuated.

Figure 6:
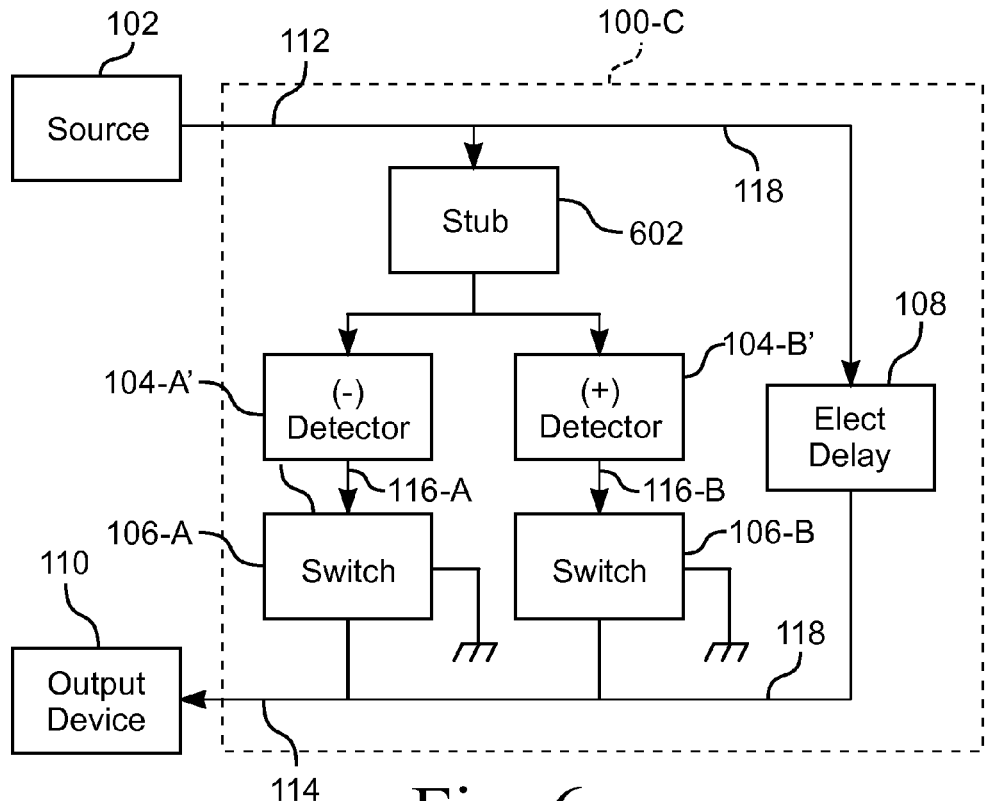
FIG. 6 is a block diagram of an embodiment of the terminal protection system with an impedance matching device.
Figure 7:
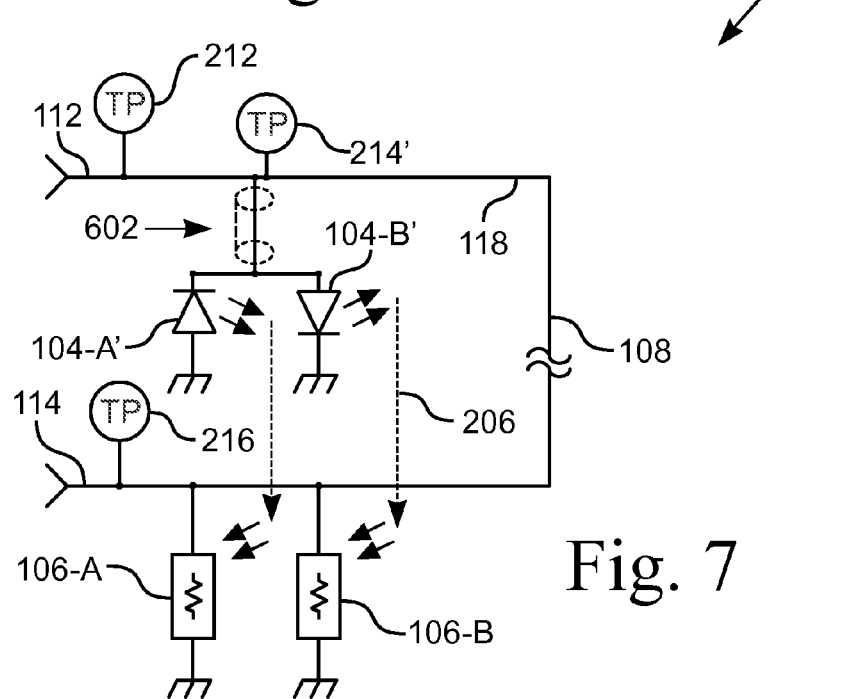
FIG. 7 is a simplified schematic diagram of the embodiment of the protection system shown in FIG. 6.

FIG. 6 illustrates another embodiment of the terminal protection system 100-C in which an impedance matching stub 602 is employed. FIG. 7 illustrates a simplified schematic diagram of the embodiment of a terminal protection system or circuit 100-C shown in FIG. 6. In the illustrated embodiment the detectors 104-A', 104-B' are low impedance laser diodes. The detectors 104-A', 104-B' are electrically terminated at the end of an impedance matching device that is a stub 602. The other end of the stub 602 is electrically connected near the input 112 of the protection system 100-C.

A one-quarter wavelength stub has the characteristic of reducing the voltage by one over the square-root of two. Half the signal would continue on to the transmission line 108. The other half of the signal travels a quarter-wave and is reflected off of a short (diode impedance is low compared to the transmission line, which effectively shorts the end of the stub), and returns a quarter-wave later. The net effect of the stub 602 is that half of the signal returns delayed in time by a half wavelength with the voltage inverted. For a sine wave signal passing through the system without needing to be clipped, the first half wavelength would pass through at half power, followed by the reflected signal adding to the first half constructively to return the signal back to full power. Theoretically, if the input signal 322-A abruptly ended, there would be a half wavelength tail at half power from the quarter-wave stub.

A one-quarter wavelength stub has the characteristic of presenting an open circuit at one end when the other end is short circuited. In one embodiment the stub 602 has an electrical length of one-quarter wavelength at the expected frequency of the transient 322-A. Such a stub 602 allows the use of low impedance detectors 104-A', 104-B' at the end of the stub 602. For example, commercially off the shelf (COTS) laser diodes are available with an impedance of 1 ohm or less. Such laser diodes have high capacitance and are capable of handling high power. Connecting such diodes directly to the input 112 results in an impedance mismatch and subsequent signal loss. Connecting such diodes as illustrated in FIGS. 6 & 7 results in no mismatch and minimal attenuation of the signal at the input 112.

One advantage is that the threshold voltage is dependent on the laser diode threshold current, not the forward voltage. This characteristic allows the threshold voltage to be increased by placing multiple laser diodes in parallel instead of in series, such as by stacking. Forward conduction below the threshold current does not attenuate the signal. In one embodiment this results in a sharper transition because there is no attenuation between the forward voltage and the threshold current.

One disadvantage with the stub 602 is that it operates best within a limited frequency range. The further the frequency deviates from that defining the quarter-wavelength of the stub 602, the greater the attenuation and voltage standing wave ratio (VSWR). A characteristic of the stub 602 is that the signal in the stub 602 is reflected and added back to the signal going to the transmission line 108. In some applications the reflected signal may cause distortion in the combined signal.

In one embodiment the detectors 104-A', 104-B' are mounted on a coplanar waveguide 402 in a manner similar to that illustrated in FIG. 4. In one such embodiment the stub 602 is a coaxial cable that is connected to the coplanar waveguide 402 such as with connectors on the waveguide 402. In another embodiment a single circuit board has a microstrip at the input 112 of the board with a quarter-wave stub 602 to the laser diodes 104. Then at some point along the delay line 108 the board transitions to a coplanar waveguide configuration.

FIGS. 8a, 8b, and 8c illustrate graphs showing how the protection system 100-C affects the input signal 312 having a transient 322 as the signal 312-A, 812-B, 812-C travels from the input 112 to the output 114 of the system 100-C. The graphs plot signal amplitude 304 over time t 302. The embodiment of the protection system 100-C illustrated in FIG. 7 includes various test points 212, 214', 216 that correspond to the signals 312-A, 812-B, 812-C illustrated on the graphs of FIGS. 8a, 8b, and 8c. Each of the signals 312-A, 812-B, 812-C includes the effects of the transient 322-A, 822-B, 822-C.

It bears noting that the graphs show amplitude 304, not polarity. The pair of detectors 104-A', 104-B', one for each polarity, have the same threshold trigger level 324 and will trigger the switches 106-A, 106-B, respectively, when the absolute value of the signal amplitude 826 reaches the threshold trigger level 324.

FIG. 8a illustrates a graph of the signal 312-A over time at the first test point 212. The first test point 212 is located at the input 112 and provides information on the input signal 312-A, including any transients 322-A as received by the protection system 100-C. The input signal 312-A includes a steady state portion 310 and a transient portion 322-A. Before the start time $t_0$ 306 of the transient 322-A, the signal 312-A at the input 112 has a steady state 310 corresponding to the normal signal from the source 102. The transient 322-A starts at time $t_0$ 306 to produce the composite input signal 312-A. The transient 322-A has a fast rise time, typically on the order of nanoseconds. The waveform of the transient 322-A varies based on the type and characteristics of the transient 322-A, plus any changes due to circuit impedance before reaching the input 112 of the protection system 100.

FIG. 8b illustrates a graph of the amplitude 304 of the two portions of the input signal 312-A that result from the stub 602. The second test point 214' is downstream of the stub 602 before the transmission line 108. For a matched quarter-wave stub, the input signal 312-A is split into halves. One half of the input signal 322-A passes the stub 602 as signal 812-B, which is in sync with the input signal 312-A and has a voltage magnitude of one over the square-root of two of the input signal 312-A. The other half of the input signal 312-A is the signal 832-B that is reflected from the terminal end of the quarter-wave stub 602. The reflected signal 832-B is one-half wave out of sync with the input signal 312-A and has a voltage magnitude of one over the square-root of two of the input signal 312-A. For illustration purposes the two signals 822-B, 832-B are shown individually instead of as a single, combined signal such as would be measured at the test point 214'. The reflected signal 832-B includes a slightly diminished transient portion due in part from the draw by the detectors 104-A', 104-B' of their operating power from the transient 322.

The chart of FIG. 8b also shows the stub signal 842-B as it would be sent at the terminal end of the stub 602. The stub signal 842-B is representative of the signal measured by the detectors 104-A', 104-B'. FIG. 8b shows the threshold trigger level 824 of the detectors 104. The detectors 104-A', 104-B' measure the signal at the terminal end of the stub 602 at time of detection $t_d$ 806, which is delayed from the transient start time $t_0$ 306 seen at the input 112. The delay from the transient start time $t_0$ 306 to the time of detection $t_d$ 806 is a result of the time required for the signal 842-B to travel from one end to the other of the quarter-wave stub 602.

When the amplitude 826 of the stub signal 842-B equals or exceeds the threshold trigger level 824, each of the detectors 104 are triggered to produce a signal 116 sent over the line 206 to a corresponding switch 106. The threshold trigger level 824 corresponds to a level that the output device 110 is capable of withstanding. The threshold trigger level 824 corresponds to the input trigger level 324 relative to the input signal 312-A. The level of the threshold trigger level 824 is one over the square-root of two of the input trigger level 324. The output device 110 has a maximum input level 328 that can be applied to it without causing damage or otherwise adversely affecting the output device 110. The threshold trigger level 824, since it is sensing a signal that is one half of the input signal 322-A, is equal to or less than one over the square-root of two of the maximum input level 328 of the output device 110. In this way the protection system 100 is not triggered for levels of the signal 312-A that the output device 110 can handle safely.

FIG. 8c illustrates a graph of the amplitude 304 of the attenuated signals 812-C, 842-C over time t 302 at the third test point 216, which is located at the output 114. The signal that goes to the output device 110 is a composite of the two signals 812-B, 832-B after passing through the transmission line 108 and being attenuated. Signal 812-C corresponds to the signal 812-B that bypasses the stub 602 and signal 832-C corresponds to the reflected signal 832-B from the stub 602.

The attenuated signals 812-C, 832-C include transient remnants 822-C, 822-C' that have a maximum amplitude less than the maximum input level 328 of the output device 110. The reduction in amplitude of the transient remnants 822-C, 822-C' is due to the switches 106 being triggered by the sensors 104 before the transient remnants 822-C, 822-C' reach the switches 106, thereby resulting in attenuated signals 812-C, 832-C.

The transient start time $t_0$ 306 is shown at the point 326 on FIG. 8a where the amplitude of the input signal 312-A crosses the threshold trigger level 324.

The attenuated signal 812-C corresponding to the signal 812-B that bypasses the stub 602 is shifted in the time domain from the input signal 312-A by the delta 830 between the transient start time $t_0$ 306 and output time $t'_0$ 808. This time delay 830 corresponds to the electrical propagation delay 108 of the protection system 100. For example, the time delay 830 is implemented by a length of transmission line 118 that has sufficient length to produce the electrical delay 108. In one test the delay 830 was on the order of 17 nanoseconds, which is sufficient to attenuate energy spikes induced from a directed energy weapon. The attenuated signal 832-C corresponding to the reflected signal 832-B from the stub 602 is shifted in the time domain from the input signal 312-A by the delta 830 between the transient start time $t_0$ 306 and output time $t'_0$ 808 plus the propagation time resulting from traveling into and being reflected from the stub 602.

The detection time $t_d$ 806 at the point 826 is where the detectors 104 first react to or detect the transient 842-B. The detector 104 has a response time before it provides an output or detected signal 116 indicating that a transient 842-B has been detected. That detected signal 116 has a propagation time to travel between the detector 104 and the corresponding switch 106. Then the switch 106 has an actuation time before it causes a low impedance connection to be made between the transmission line 118 and ground. The sum of the propagation time 818 of the signal 842-B along the stub 602, the detector response time, the detected signal propagation time, and the switch actuation time is the switching time delay 816. The switch 106 is actuated at switch time $t_s$ 814 such that the switch 106 attenuates and/or reflects the signal at the output 114 to produce the attenuated waveforms 812-C, 832-C illustrated in FIG. 8c.

The attenuation and/or reflection occurs because the switching time delay 816 is less than or equal to the delta 830 representative of the electrical propagation delay 108 of the transmission line 118. In this way the low impedance connection across the output 114 attenuates the input signal 312 such that it has the attenuated waveforms 812-C, 832-C illustrated in FIG. 3c.

The terminal protection system 100 includes various functions. The function of delaying the electrical signal 312-A is implemented, in one embodiment, by a transmission line having a length and propagation speed such that the electrical propagation time along the transmission line is greater than the switch network time, which is the sum of the detection time of the detector 104, the propagation delay of the detection signal 116, and the actuation time of the switch 106. In another embodiment the electrical propagation time along the transmission line is greater than the sum of the time for the signal to propagate along the stub 602 to the detectors 104' and the switch network time.

The function of attenuating a transient 322-A is implemented, in one embodiment, by at least one switch 106 that shorts the output 114 to ground. In one such embodiment, the switch 106 is a photoswitch that is actuated to a conductive state by a signal 116 from a sensor 104. The switch 106 shorts the transmission line to ground, thereby causing attenuation and reflection of the transient 322-A. In another embodiment the switch 106 is in series with the transmission line 118 with a normal low impedance that changes to a high impedance when the switch 106 is actuated, thereby attenuating the transient 322-A.

The function of detecting a transient is implemented, in one embodiment, by a detector 104 connected at the input 112. In one such embodiment, the detector 104 is a LED that emits light when a sensed voltage threshold 324 is reached. The emitted light is directed into a light tube or optical fiber that is connected to one or more photoswitches 106. In another such embodiment the detectors 104-A', 104-B' are electrically connected to a stub 602 that is electrically connected at the input 112.

The function of minimizing the time to actuate the switch 106 is implemented, in one embodiment, by positioning the detector 104 proximate the switch 106 with a short connection 206. In another embodiment, the function of minimizing the time to actuate the switch 106 is implemented by electrically connecting the switch 106 across a tapered structure 506 or similar structure where the distance between the conductor 118-A and the ground plane 408 proximate the switch 106 is substantially less than the distance away from the switch 106. In this way the switch size is reduced to accommodate the shorter distance between the conductor 118-A and the ground plane 408.

The function of attenuating a transient 322 before it reaches the output 114 is implemented, in one embodiment, by the switch network operating time being less than or equal to the electrical propagation delay 108. The switch network operating time is determined by the detector response time, the detector signal propagation time from the detector 104 to the switch 106, and the switch 106 actuating time.

The function of impedance matching the detectors 104 to the transmission line 108 is implemented by an impedance matching device connected at one end adjacent the input 112 and at the other end to the detectors 104-A', 104-B'. The impedance matching device 602 prevents the detectors 104-A', 104-B' from adversely impacting the input signal 312 as it travels from the input 112 to the output 114. In one such embodiment the impedance matching device is a stub 602 with one end electrically connected adjacent the input 112 and the other end electrically connected to the detectors 104-A', 104-B'. In one such embodiment the stub 602 is a quarter-wavelength of the frequency corresponding to that of the transient 322-A to be attenuated.

From the foregoing description, it will be recognized by those skilled in the art that a terminal protection system 100 has been provided. The protection circuit 100 prevents a high voltage transient 322-A from propagating from a source 102, such as a front end of a radar system, to an output device 110, such as a low noise amplifier (LNA) that is susceptible to damage from such high voltage transients 322-A. The protection circuit 100 has an electrical domain propagation delay 108 that is longer than the delay in sensing the transient 322-A, the propagation delay of the detection signal 116, and the actuation time of the device 106 attenuating the transient 322-A. In this way transients that have a very fast rise time or that are not attenuated by conventional means are prevented from propagating to the output device 110. Furthermore, in order to minimize impedance mismatches of the detectors 104 to the line between the input 112 and the output 114, an impedance matching device 602 is connected between the input 112 and the detectors 104'. The impedance matching device 602 minimizes line losses resulting from using detectors 104' that have a low impedance and/or high capacitance.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for attenuating a transient, said apparatus comprising:
    an input configured to receive an input signal;
    an output configured to connect to a driven device;
    a stub having a first end electrically connected adjacent to said input;
    a detector electrically connected to a second end of said stub, said detector responsive to an amplitude of a portion of said input signal in said stub, said detector providing a detected signal upon sensing the transient in said input signal;
    a switch operatively coupled to said detector, said switch having an actuated state in response to said detected signal, said switch electrically connected to said output such that said switch applies a low impedance across said output when said switch is in said actuated state; and
    an electrical connection between said input and said output, said electrical connection having an electrical propagation delay greater than a time interval for said switch to actuate after said input signal exceeds a detection setpoint of said detector, whereby the transient is detected and said switch is actuated before the transient electrically propagates to said output.

2. The apparatus of claim 1 wherein said stub has a length of one quarter-wavelength.

3. The apparatus of claim 1 wherein said detector is an electrical-to-optical converter, said detected signal is an optical signal, and said switch has an optical input.

4. The apparatus of claim 1 wherein said detector is a light emitting diode and said switch is a photoswitch.

5. The apparatus of claim 1 wherein said detection setpoint of said detector is less than or equal to one over the square-root of two of a maximum input level of said driven device.

6. The apparatus of claim 1 wherein said electrical connection is a transmission line electrically connecting said input to said output.

7. The apparatus of claim 1 wherein said electrical connection is a conductor in a coplanar waveguide and said switch is electrically connected between said conductor and said ground plane proximate said output.

8. The apparatus of claim 7 wherein a gap between said conductor and said ground plane proximate said switch is substantially less than a separation between said conductor and said ground plane at distance away from said switch.

9. An apparatus for protecting a driven device from a high voltage signal from a source, said apparatus comprising:
a transmission line having an input and an output, said transmission line having a propagation delay defined as a time required for an input signal to be electrically propagated from said input to said output;
an impedance matching device connected adjacent said input;
a first detector connected to said impedance matching device, said first detector responsive to a portion of said input signal in said impedance matching device, said first detector providing a first detected signal when said input signal includes a transient having an amplitude exceeding a first value; and
a first switch connected to said output, said first switch responsive to said first detected signal, said first switch having a conductive state upon actuation by said first detected signal, said conductive state placing a low impedance connection between said transmission line and a ground at said output, said propagation delay of said transmission line greater than or equal to a switching time, said switching time defined as a time required for said first switch to enter said conductive state after said input signal exceeds said first value at said first detector;
whereby said transient is attenuated by said first switch before said transient is able to propagate to said output.

10. The apparatus of claim 9 wherein said impedance matching device is a stub with one end connected adjacent said input and the other end connected to said first detector.

11. The apparatus of claim 9 further including a second detector connected to said impedance matching device and a second switch connected to said output, said second detector responsive to said input signal and providing a second detected signal when said input signal includes said transient, said second switch having a conductive state upon actuation by said second detected signal.

12. The apparatus of claim 11 wherein said first detector is responsive to a positive portion of said input signal and said second detector is responsive to a negative portion of said input signal.

13. The apparatus of claim 11 wherein said first and second detectors are each an electrical-to-optical converter, said first and second detected signals are optical signals, and said first and second switches each have an optical input.

14. The apparatus of claim 9 wherein said first value of said first detector is less than or equal to a maximum input level of said driven device.

15. The apparatus of claim 9 wherein said transmission line is a conductor in a coplanar waveguide and said first switch is electrically connected between said conductor and said ground plane proximate said output.

16. An apparatus for protecting a driven device from a high voltage signal from a source, said apparatus comprising:
a transmission line having an input and an output, said transmission line having a propagation delay defined as a time required for an input signal to be electrically propagated from said input to said output;
an impedance matching device connected adjacent to said input; and
a switch network causing said input signal to be attenuated at said output when a transient is detected at said impedance matching device, said transient defined as a portion of said input signal where an amplitude of said input signal exceeds a first value, said switch network having a switching time defined as a time required for said switch network to actuate after said input signal exceeds said first value at said input, said switching time less than or equal to said propagation delay whereby said transient is attenuated by said switch network before said transient propagates to said output.

17. The apparatus of claim 16 wherein said impedance matching device is a stub with one end connected adjacent said input and the other end connected to said first detector.

18. The apparatus of claim 17 wherein said stub has a length of a quarter-wavelength.

19. The apparatus of claim 16 wherein said switch network includes a plurality of detectors monitoring said input, said switch network includes a plurality of switches proximate said output, and said plurality of switches responsive to said plurality of detectors.

20. The apparatus of claim 19 wherein transmission line is a conductor on a coplanar waveguide, and said conductor having a length sufficient to produce said propagation delay.

* * * * *